United States Patent [19]
Droit et al.

[11] Patent Number: 5,825,375
[45] Date of Patent: *Oct. 20, 1998

[54] INK JET SYSTEM WITH SERIAL DATA PRINTHEADS

[75] Inventors: Jimmy L. Droit, St. Peters, Mo.; Ronald J. Johnsen, Cary, N.C.; Mark V. Reinders, St. Louis; Mark K. Virkus, Ellisville, both of Mo.

[73] Assignee: Diagraph Corporation, Earth City, Mo.

[*] Notice: The term of this patent shall not extend beyond the expiration date of Pat. No. 5,606,349.

[21] Appl. No.: 717,795

[22] Filed: Sep. 23, 1996

Related U.S. Application Data

[63] Continuation of Ser. No. 206,140, Mar. 4, 1994, Pat. No. 5,606,349.

[51] Int. Cl.$^6$ .................................................. B41J 2/07
[52] U.S. Cl. .................. 347/4; 347/5; 347/9; 347/10; 347/13; 347/50
[58] Field of Search .................. 395/104; 358/296; 347/4, 5, 9, 10, 13, 50

[56] References Cited

U.S. PATENT DOCUMENTS

| | | | |
|---|---|---|---|
| 1,709,926 | 4/1929 | Weaver . | |
| 2,278,940 | 4/1942 | Murphy | 278/5.2 |
| 3,757,349 | 9/1973 | Fulton | 346/49 |
| 3,858,703 | 1/1975 | Duley | 400/128.08 |
| 3,988,742 | 10/1976 | Meier et al. | 347/9 |
| 4,116,626 | 9/1978 | Vorner | 347/4 |
| 4,146,900 | 3/1979 | Arnold | 346/75 |
| 4,228,821 | 10/1980 | Stark | 137/522.1 |
| 4,378,564 | 3/1983 | Cross et al. | 346/75 |
| 4,393,386 | 7/1983 | DiGiulio | 346/75 |
| 4,415,910 | 11/1983 | Reece | 346/140 R |
| 4,608,575 | 8/1986 | Morgan | 346/33 R |
| 4,689,694 | 8/1987 | Yoshida | 358/298 |
| 4,775,868 | 10/1988 | Sugiura | 346/46 |
| 4,792,817 | 12/1988 | Barney | 346/140 R |
| 5,025,322 | 6/1991 | Ng | 358/298 |
| 5,115,493 | 5/1992 | Jeanblanc et al. | 395/117 |
| 5,138,310 | 8/1992 | Hirane et al. | 340/811 |
| 5,317,344 | 5/1994 | Beaman | 346/139 R |

OTHER PUBLICATIONS

Cirrus Logic, "Raster Printer Accelerator Manual," Jan. 1992 p. 61, CL–GP3150/4150.

*Primary Examiner*—Valerie Lund
*Attorney, Agent, or Firm*—Senniger, Powers, Leavitt & Roedel

[57] ABSTRACT

A system for ink jet printing of messages on articles being fed forward one after another in a predetermined path. A terminal includes a keyboard for entering message data representative of the messages. A controller interconnected with the terminal processes the message data received from the terminal and stores the message data for the messages. The controller has an output port for providing serial output data in a bit map format representative of the messages. A plurality of ink jet printheads are serially connected and positioned adjacent the path of the articles to print the messages on the articles in response to the serial output data. A single cable connects the output port of the controller to the first printhead for providing the output data to the first printhead. A separate cable interconnects each printhead to its next succeeding printhead for serially providing the data to the remaining printheads so that the printheads are connected in a daisy chain configuration. Power is also supplied to the printheads in a daisy chain configuration.

13 Claims, 3 Drawing Sheets

FIG. 2

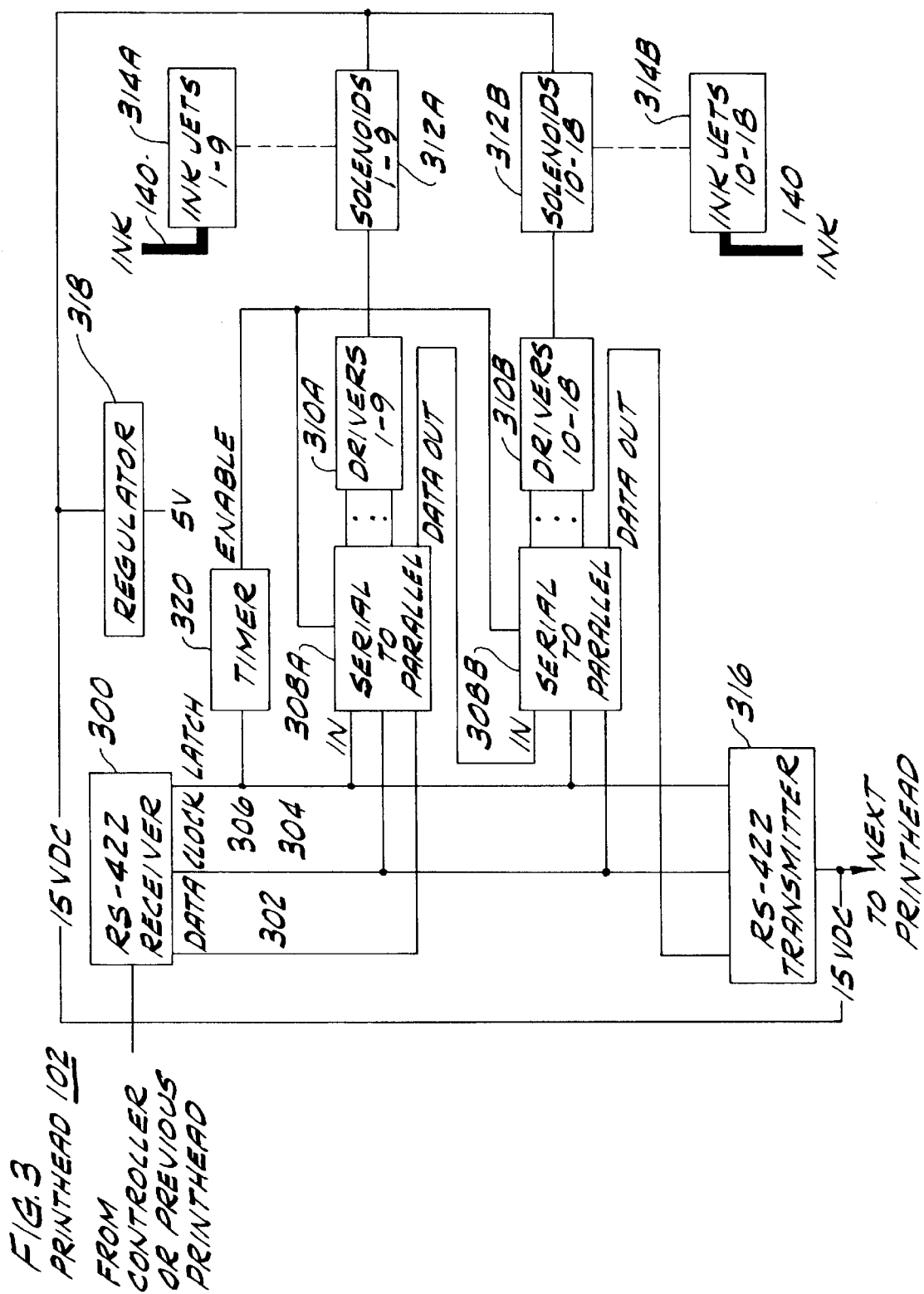

INK JET SYSTEM WITH SERIAL DATA PRINTHEADS

This is a continuation of application Ser. No. 08/206,140, filed Mar. 4, 1994, now U.S. Pat. No. 5,606,349.

BACKGROUND OF THE INVENTION

This invention relates to ink jet printing systems, and in particular, such systems which employ a controller for controlling multiple printheads which are spaced for printing on moving surfaces such as on cartons or boxes being fed forward by a conveyor.

Ink jet printing systems include a plurality of ink jet printheads, each having a matrix of ink jets. Each ink jet has a nozzle constituting a valve seat at its outlet end, the seat having an orifice for injection of drops of ink. A solenoid actuated valve member engages and disengages from the seat to close and open the orifice. A controller for each printhead including a microprocessor, processes data for actuating the solenoids to print messages and to store data. In the past, such controllers communicated with each printhead via a separate cable for each printhead which directly connected the controller to each printhead. In addition, such controllers employed a ASCII data format in which parallel data was provided to each of the printheads. This required a large amount of cabling and required each printhead to print a separate line of text information. There is a need for an ink jet printing system which reduces the amount of cabling between the controller and the printheads and which communicates with the printheads via a serial data format. There is also a need for the ability for such a system to allow one printhead to print more than one line of text or to configure the system such that a text line can span across more than one printhead.

SUMMARY OF THE INVENTION

It is an object of this invention to provide an ink jet printer system which is low cost and flexible. It is another object of this invention to provide an ink jet printer system which employs only a single cable between the controller and the printheads so that the printheads may be serially connected. It is another object of this invention to provide an ink jet printer system which distributes power as well as data in a serial manner reducing the number of power cables which are necessary. It is another object of this invention to provide an ink jet printer system which employs printheads that can print more than one text line at a time or which allows a text line to span across more than one printhead without employing custom fonts. It is another object of this invention to provide an ink jet printer system having a controller which provides data in a bit map format to its printheads.

In one form, the invention comprises a system for ink jet printing of messages on articles being fed forward one after another in a predetermined path. A terminal including a keyboard is used for entering message data representative of the messages. A controller interconnected with the terminal processes the message data received from the terminal and stores the message data for the messages. The controller has an output port for providing output data representative of the messages. First and second serially connected ink jet printheads are positioned adjacent the path to print the messages on the articles in response to the output data. A first interconnecting cable connects the output port of the controller to the first printhead for providing the output data to the first printhead. A second interconnecting cable connects the first printhead to the second printhead for providing to the second printhead at least some of the output data provided to the first printhead.

Other objects and features will be in part apparent and in part pointed out hereinafter.

BRIEF DESCRIPTION OF THE DRAWINGS

FIG. 2 is a block diagram illustrating the controller of FIG. 1 according to the invention.

FIG. 3 is block diagram illustrating one of the printheads of FIG. 1 according to the invention for use with the controller of FIG. 2.

Corresponding reference characters indicate corresponding parts throughout the drawings.

DETAILED DESCRIPTION OF THE PREFERRED EMBODIMENTS

Figure 1:
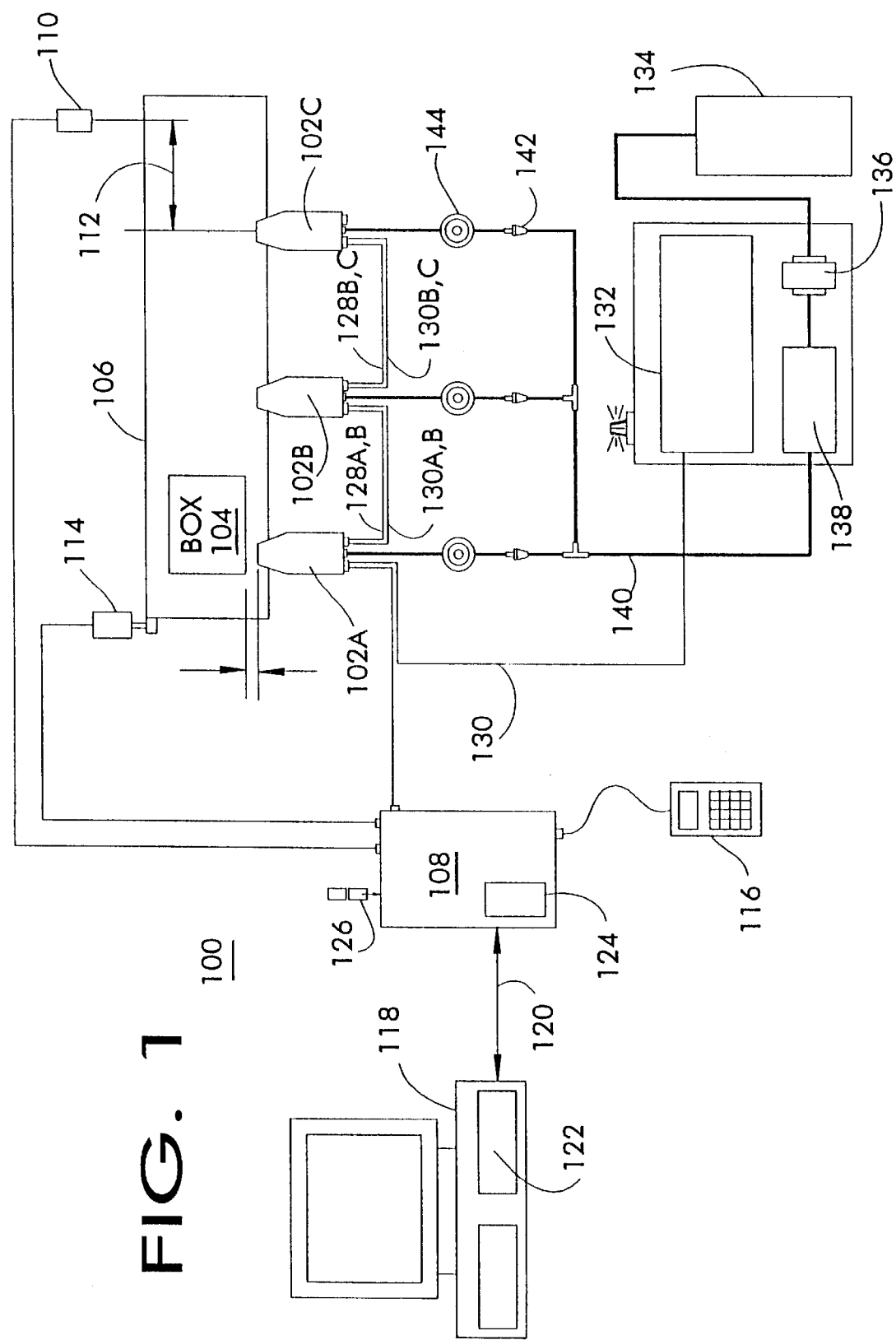
FIG. 1 is a schematic diagram illustrating the ink jet system with serial data printheads according to the invention.

FIG. 1 illustrates an ink jet system 100 with serially connected printheads 102 according to the invention. The conventional aspects of the system 100 are disclosed in the prior art, such as U.S. Pat. Nos. 4,723,131, 4,792,817, and 4,924,241, each of these patents being incorporated herein in their entirety by reference. The purpose of ink jet system 100 is to print messages on articles such as boxes 104 being fed forward one after another in a predetermined path such as by a conveyor 106.

System 100 includes a controller 108 for controlling the operation of the system and particularly for controlling printheads 102. Initially, the location or position of each box is detected by a photocell 110 which precedes by a known offset 112 the last printhead 102C. Photocell 110 is connected to controller 108 to provide such location or position information. In addition, a speed encoder 114 is associated with the conveyor 106 to indicate to controller 108 the speed at which the conveyor is travelling. As a result, controller 108 knows the position of each box 104 on conveyor 106 at any point in tine.

Controller 108 controls the printheads 102 in order to print specific messages on each of the boxes 104. The message may be the same on each box or it may be specific to the particular box. For example, controller 108 may be connected to a scale (not shown) for weighing each box and controller 108 would control printheads 102 to print the weight of each box on the box 104. Alternatively, controller 108 may be connected to a bar code scanner (not shown) which reads the bar code on each box 104 and prints information relating thereto, such as serial number or manufacturing date. The messages which are to be printed result from instructions provided to the controller 108 by some type of input device such as an LC100 hand-held terminal 116 or a personal computer 118 having a keyboard for permitting an operator to enter messages. Computer 118 may be networked to the controller 108 via a local area network (LAN) line 120 such as an ARCNET® by Datapoint Corporation which interconnects LAN terminal boards 122 and 124 respectively located in the computer and the controller.

Furthermore, controller 108 may have one or more slots for receiving memory cards 126 for expanding the memory of controller 108 or for providing predetermined information to controller 108.

Each printhead 102 requires both a signal line 128 and a power line 130 for providing both data and power to each printhead 102 for controlling the printhead. Preferably, the printheads are serially connected as illustrated in FIG. 1. This connection is sometimes referred to as a "daisy chain" connection in that signal line 128 is connected to only the first printhead 102A. A separate signal line 128AB interconnects printheads 102A and 102B and another separate signal line 128BC interconnects printheads 102B and 102C. As a result, signal line 128 is connected only to the first printhead 102A and is not connected directly, but is connected indirectly as will be described below, to printheads 102B and 102C. Similarly, power line 130 is connected only to the first printhead 102A. A separate power line 130AB interconnects printheads 102A and 102B to provide power to printhead 102B. Additionally, a separate power line 130BC is connected between printheads 102B and 102C to provide power to printhead 102C.

Power line 130 receives its power from power supply 132. In general, power supply 132 may be also used to energize a pump 134 which supplies pressurized ink from a reservoir 136 through an accumulator 138 to an ink supply line 140 which is connected to each of the printheads 102 via "a T" connector 141. A quick disconnect 142 may be provided in line with each of the printheads 102 to allow the printhead 102 to be quickly separated from the ink supply. In addition, an ink regulator 144 may be placed in series with the pressurized ink line 140 connected to each printhead 102 to regulate the volume or pressure of ink being applied to each printhead by accumulator 138. An example of such an ink delivery system with accumulator is disclosed in co-pending, co-assigned Ser. No. 08/206,447 filed Mar. 4, 1994, titled "Ink Jet Printing System."

In general, controller 108 and power supply 132 are remotely located from the printheads 102. In some cases, the remote location may be several hundred meters from the location of the printheads 102. Therefore, the invention provides a significant advantage over the prior art in that a single signal line 128 is used to interconnect the controller 108 and the first printhead 102A and a single power line 130 is used to interconnect the power supply 132 and the first printhead 102A. Signal lines 128AB and 128AC are relatively short since the printheads are located contiguous to each other. Similarly, power lines 130AB and 130BC are also short because of the close location of all the printheads. In contrast, the prior art generally suggests that a separate signal line interconnecting each printhead with the controller and the power supply resulting in a significant amount of cabling being necessary to interconnect these devices.

Although FIG. 1 is illustrated with only three printheads 102A, 102B, and 102C, it is contemplated that the invention may have any number of serially connected printheads, such as 24 printheads in series. In general, controller 108 provides serial data to the first printhead 102A which is clocked through the printhead and continues via signal line 128AB to the second printhead 102B and continues via signal line 128AC to the third printhead 102C. For example, suppose printhead 102A will be printing a character "X," printhead 102B will be printing a character "Y," and printhead 102C will be printing a character "Z" so that the combined printheads would be printing "XYZ." Controller 108 would provide the serial data such that character Z would be clocked into printhead 102A. Next, controller 108 would clock character Y into printhead 102A causing character Z which had been previously clocked into printhead 102A to be clocked into printhead 102B. Finally, controller 108 would clock character X into printhead 102A causing character Y to be clocked into printhead 102B and, in turn, causing character Z to be clocked into printhead 102C. Each printhead would then have the appropriate data for executing the print operation.

Accordingly, system 100 constitutes a system for ink jet printing of messages on articles such as boxes 104 being fed forward one after another along a predetermined path such as the path defined by conveyor 106. System 100 includes terminal 116 and/or personal computer 118, either of which constitutes a terminal including a keyboard for entering message data representative of the messages. Controller 108 constitutes a controller interconnected with the terminal for processing the message data received from the terminal and storing the message data for the messages. Controller 108 has an output port to which signal line 128 is connected for providing output data representative of the messages. Printheads 102A and 102B constitute first and second serially connected ink jet printheads positioned adjacent the path defined by conveyor 106 to print the messages on the boxes 104 in response to the output data. Signal line 128 constitutes first interconnecting means connecting the output port of the controller 108 to the first printhead 102A for providing the output data to the first printhead. Signal line 128AB constitutes second interconnecting means connecting the first printhead 102A to the second printhead 102B for providing to the second printhead at least some of the output data provided to the first printhead. Reservoir 134, pump 136, and accumulator 138 constitute means for supplying ink to the jets of the printheads 102.

Figure 2:
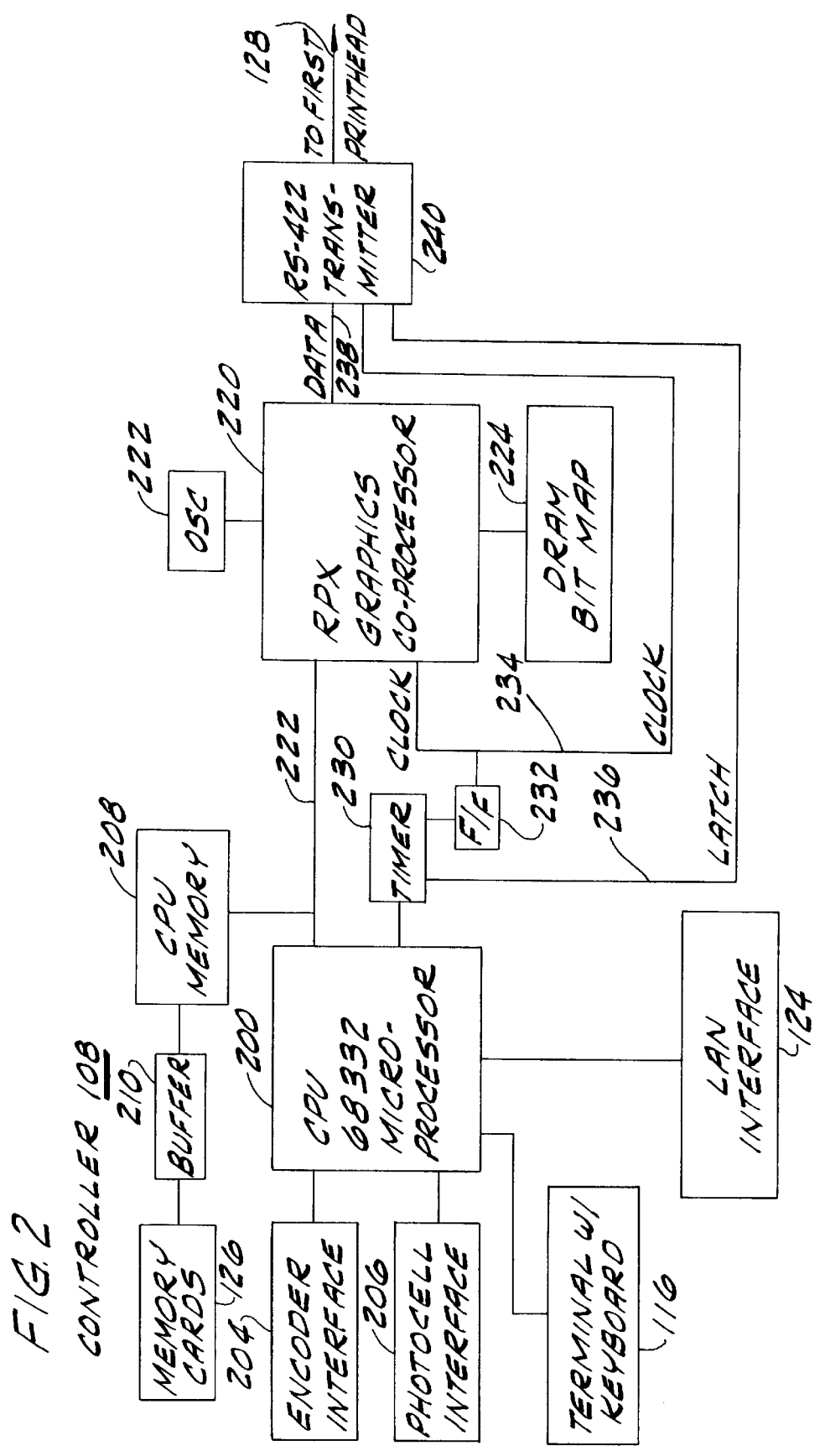

FIG. 2 illustrates in block diagram form one preferred embodiment of the controller 108. Controller 108 is built around a central processing unit 200 such a Motorola 68332 microprocessor. CPU 200 receives various information as generally indicated above with regard to FIG. 1. In particular, a terminal with keyboard 116 may be connected to CPU 100 to define the messages. Alternatively, or in addition, CPU 200 may be part of a network including an LAN interface board 124 communicating with the CPU 200 either directly or via a bidirectional parallel port (not shown). Controller 108 also includes an encoder interface 204 for communicating with and receiving signals from the speed encoder 114 which monitors the velocity of conveyor 106. Additionally, controller 108 includes a photocell interface 206 which communicates with and receives signals from photocell 110 to monitor the position of the boxes 104 as they enter the print area.

Information provided to CPU 200 is stored in a CPU memory 208 such as a random access memory which stores information in a ASCII format. Additionally, a buffer 210 may be provided to accommodate the additional memory cards 126 which may be added to controller 108.

In order to convert the ASCII format information stored in CPU memory 208, controller 108 also includes a graphics co-processor 220 such as an RPX chip manufactured by Cirrus Logic (CL-GP4150 Raster Printer Accelerator). CPU 200 feeds the information in CPU memory 208 via line 222 to co-processor 220, which converts the ASCII format information stored within CPU memory 208 into a bit map form. This bit map information is stored by co-processor 220 in a dynamic random access memory 224. CPU 200 controls a timer circuit 230 which in turn controls a flip-flop circuit 232 which generates a clock signal via line 234. Co-processor 220 may also be associated with a reference oscillator 222. Timer 230 also generates a latch signal synchronized with the clock signal, the latch signal being provided via line 236. The clock signal via line 234 is used by co-processor 220 to clock the bit map data out of DRAM 224 and to provide such data via data line 238. A serial transmitter such as an RS-422 chip (SN75ALS197) manufactured by Texas Instruments is connected to data line 238 as well as being connected to clock line 234 and latch line 236 to transmit the data, clock, and latch signals to the first printhead 102A via signal line 128. The text and graphics to be printed by the printheads 102 is bit mapped in memory 224 and shifted out serially by the co-processor 220. The printheads 102 are treated as if they are one combined printhead stacked one on the other, although they can be vertically spaced from one another. The serial bits provided via signal line 128 are shifted through each printhead and onto the next printhead. The number of times that the serial bits are shifted is the sum of all the orifices in the printhead chain so that when the shifting stops, each printhead has the proper bits for that printhead. As a result, printheads having different numbers of ink jets or different orifices may be combined together. A text line can span across more than one printhead and one printhead can print more than one text line. In addition, text can be rotated or inverted. This is in contrast to the prior art where a custom font was needed if each printhead was not limited to only one text line. According to the invention, any size and number of printheads can be connected to the controller unit and daisy chained together, such as a seven dot head, a nine dot head, an eighteen dot head, a twenty-four dot head, or a thirty-two dot head, or any other size.

FIG. 3 illustrates in block diagram form one preferred embodiment of the printhead 102. Preferably, each printhead has the same configuration so that the printheads are interchangeable. Each printhead 102 includes a serial receiver 300 which is connected to a signal line connected to a previous printhead or to controller 108. For example, the serial receiver (300) of printhead 102A is connected to the serial transmitter 240 of controller 108 via signal line 128. The serial receiver (300) of printhead 102B is connected to the serial transmitter (316) of printhead 102A via signal line 128AB. Similarly, the serial receiver (300) of printhead 102C is connected to the serial transmitter (316) of printhead 102B via signal line 128BC. As a result of these connections, each serial receiver 300 receives a data signal which is provided via a data line 302, a clock signal which is provided via a clock line 304 and a latch signal which is provided via a latch line 306. Printhead 102 includes an array of serial to parallel registers 308 which are serially connected. The number of registers depends on the number of ink jets of the printhead. In the embodiment illustrated in FIG. 3, an eighteen ink jet printhead is shown. Therefore, two registers 308, each having nine outputs, are employed. Initially, register 308A receives the data via line 302 and converts the serial data to parallel information for selectively energizing nine drivers 310A. Drivers 310A selectively actuate nine solenoids 312 to drive nine ink jets 314 which are arranged in a matrix and supplied with ink via pressurized ink supply line 140 connected to accumulator 138. The solenoids 312 and their respective controlled ink jets 314 constitute a plurality of electrically actuated valve means, one for each jet, adapted for electrical operation in response to the data bits for ejecting a drop of ink from its respective nozzle.

Register 308A also receives both clock and latch signals via clock line 304 and latch line 306, respectively, so that data can be clocked through register 308A and provided at its data out line to the next serial to parallel register 308B. Once again, register 308B converts the serial data to parallel signals which are latched to energize nine drivers 310B for actuating nine solenoids 312B which control nine ink jets 314B. The data out line of register 308B is then connected to a serial transmitter 316 which is also connected to the clock line 304 and they latch line 306. Transmitter 316 transmits the data, clock, and latch signals along with a 15 volt dc signal provided from the power supply 132 and used to drive the solenoids 312, to the next printhead in the daisy chain series. Printhead 102 also includes a voltage regulator 318 which reduces and controls the 15 volt dc power line to provide a 5 volt logic signal which is employed by the components of printhead 302 such as receiver 300, and registers 308. Printhead 102 also includes a timer 320 responsive to the latch signal provided by latch line 306 to generate an enable signal which enables the registers 308. Timer 320 is variable and determines size of the dots printed by the ink jets as the jets eject drops of ink onto the surface of the box. As a result, the dots are in patterns selected from characters for the messages being printed.

In general, printhead 102 of FIG. 3 operates as follows. Each serial receiver 300 and serial transmitter 316 has a data line 302, a clock line 304, and a latch line 306. The serial print data bit stream is clocked synchronously into the first register 308A and back out through to the next register 308B and finally to the next printhead via transmitter 316. When controller 108 has completed clocking out all of the print data, it sends a latch pulse via the latch line 306. The print data is then latched into the registers 308 in the printheads with the rising edge of the latch pulse. The trailing edge of the latch pulse triggers timer 320 which enables the parallel output of the registers 308 and allows print data to go to the solenoid drivers 310. A logic one turns on a solenoid driver to actuate its solenoid 312 and a logic zero does not. When a solenoid 312 is energized, a valve is opened and ink, under pressure as provided via ink supply line 140, passes through an orifice. The adjustable timer 320 sets the size of the dots by the amount of time that the ink valve stays open.

More particularly, the printhead operation is as follows. Receiver 300 converts differential signals which are provided via the signal line 128 to standard logic signal levels. The differential signals consist of two inputs for each signal line. When one of the signal line inputs goes to 5 volts, the other input goes to 0. A resistor (not shown) is connected across each differential pair to match the characteristic impedance of the cable 128. Data line 302, clock line 304, and latch line 306 are logic level signal outputs which may be pulled up to 5 volts in order to interface these TTL outputs to the CMOS inputs of the registers 308. The data is shifted one bit with each clock pulse and shifted out the data out port of register 308A to the data in port of register 308B. In the same way, data is shifted out of register 308B via its data out port to the serial transmitter 316.

When the controller 108 is finished shifting out the data to all the printheads, it sends the latch pulse via latch line 306 which is a positive going pulse. The rising edge of the latch pulse latches the data into the registers 308 of each printhead. The pulse width of the latch signal allows time for the propagation delay. The falling edge of the latch pulse triggers timer chip 320 which is a 74HC221 manufactured by Texas Instruments. When timer 320 is triggered, it provides an enable output which goes low for a time period preset by a resistor capacitor (RC) combination (not shown) which has a range between 60 and 450 microseconds. The enable output of timer 320 is connected to the enable ports of the registers 308. Each register 308 has 9 parallel output pins, totalling 18, which control the 18 solenoid driver circuits. A low signal to the output enable pins of the registers 308 causes the data in the registers to be connected to their output pins and a logic one enables the solenoid driver circuits 310 or a logic zero disables the driver circuits 310. After the timer 320 times out, the output enable pins of the registers 308 are brought high and the outputs go into a high impedance state so that the solenoid driver circuits 310 are disabled by a pull-down resistor (not shown).

One significant advantage of the circuit of printhead 102 over the prior art is that is minimizes the amount of cabling from the controller 108 to a group of printheads. For example, 24 printheads would require 24 cables connected to controller 108, on going to each printhead. Since controller 108 is remote from the printheads and sometimes several hundred feet from the printheads, this requires a significant amount of cabling. In contrast, the circuit of printhead 102 requires only one cable which connects controller 108 to the first printhead 102A and then cables 128AB and 128BC connect the first printhead 128A to the second printhead 128B and the second printhead 128B to the third printhead 128C. This also reduces the amount of circuitry required in the controller 108 and reduces the number of wires in the cable. A twenty-four dot printhead would normally require a cable of 25 wires or more. The invention reduces the cable connected to the controller 108 to only the six wires needed for carrying the differential data clock and latch signals.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. A system for printing of messages on articles being fed forward one after another in a predetermined path, said system comprising:

an input for entering message data representative of the messages;

a controller interconnected with the terminal for processing the message data received from the terminal and storing the message data for the messages, said controller having a output port for providing output data representative of the messages;

first and second serially connected printheads positioned adjacent said path to print the messages on the articles in response to the output data;

an interconnect connecting the output port of the controller to the first printhead for providing the output data to the first printhead and connecting the first printhead to the second printhead for providing to the second printhead at least some of the output data provided to the first printhead; and an ink supply line for supplying ink to the printheads.

2. A system for printing of messages on articles being fed forward one after another in predetermined path, said system comprising:

an input for entering message data representative of the messages;

a controller interconnected with the terminal for processing the message data received from the terminal and storing the message data for the messages, said controller having a output port for providing output data representative of the messages;

first and second serially connected printheads positioned adjacent said path to print the messages on the articles in response to the output data;

an interconnect connecting the output port of the controller to the first printhead for providing the output data to the first printhead and connecting the output port to the second printhead for providing to the output data to the second printhead; and an ink supply line for supplying ink to the first printhead and for supplying ink from the first printhead to the second printhead whereby ink for the second printhead is supplied via the first printhead.

3. The system of claim 2 wherein the controller comprises a CPU for receiving the message data, a CPU memory for storing the message data, a bit map memory, and a graphics processor for converting the message data in the message memory into a bit map format and storing the converted data in the bit map memory, said graphics processor providing the converted data to the output port of the controller.

4. The system of claim 2 further comprising a power supply remotely located from the printheads for supplying power to the printheads, a first power cable connecting the power supply to the first printhead thereby providing power to the first printhead and a second power cable connecting the first printhead and the second printhead thereby providing power to the second printhead.

5. The system of claim 2 wherein the ink supply comprises:

an ink supply line including a "T" connector supplying ink to the first and second printheads.

6. The system of claim 5 further comprising a first regulator in series between the "T" connector and the first printhead and a second regulator in series between the "T" connector and the second printhead.

7. The system of claim 6 including a third serially connected printhead positioned adjacent said path to print the message on the articles in response to the output data, wherein the interconnect connects the output port to the controller to the third printhead for providing the output data to the third printhead and wherein the ink supply supplies ink from the second printhead to the third printhead.

8. The system of claim 7 wherein the supply comprises a second "T" connector connected to the ink supply line and supplying ink to the second and third printheads.

9. The system of claim 8 further comprising a first regulator in series between the first "T" connector and the first printhead, a second regulator in series between the second "T" connector and the second printhead and a third regulator in series between the second "T" connector and the third printhead.

10. The system of claim 9 wherein each printhead comprises:

a serial input port, a driver circuit connected to the serial input port and responsive to the output data provided to its serial input port, a serial output port connected to the serial input port, a plurality of ink jets arranged in a matrix and adapted for ejection of drops of ink from nozzles onto a surface of the articles travelling by the printhead to print dots on said surface in patterns selected from characters for the messages, and a plurality of electrically actuated valve means, one for each jet, connected to the driver circuit, each valve means adapted for electrical operation in response to the output data provided to the driver circuit for ejecting a drop of ink from its respective nozzle;

wherein the output port of the controller comprises a serial output port for providing the output data in a serial format;

wherein the interconnect comprises a first cable connecting the serial output port of the controller to the serial input port of the first printhead and a second cable connecting the serial output port of the first printhead to the serial input port of the second printhead.

11. The system of claim 10 wherein the serial input port comprises a serial receiver and the serial output port comprises a serial transmitter.

12. The system of claim 10 wherein the driver circuit includes a serial to parallel register having a serial input for receiving the serial input data provided to the serial input port and having a plurality of parallel outputs, one connected to each valve means.

13. The system of claim 12 further comprising an adjustable timer for enabling the parallel outputs of the register for a preset period of time whereby the size of the dots printed by each nozzle is determined by the preset period.

* * * * *